(12) United States Patent
Armbruster et al.

(10) Patent No.: US 9,077,140 B2
(45) Date of Patent: Jul. 7, 2015

(54) LASER DEVICE AND METHOD FOR GENERATING LASER LIGHT

(75) Inventors: Kevin L. Armbruster, Chicopee, MA (US); Brad D. Gilmartin, Gardner, MA (US); Peter J. Kueckendahl, Bad Oldesloe (DE); Bernard J. Richard, Dudley, MA (US); Daniel J. Ryan, Sycamore, IL (US)

(73) Assignee: ALLTEC ANGEWANDTE LASERLIGHT TECHNOLOGIE GMBH, Selmsdorf (DE)

( * ) Notice: Subject to any disclaimer, the term of this patent is extended or adjusted under 35 U.S.C. 154(b) by 0 days.

(21) Appl. No.: 14/342,503

(22) PCT Filed: Jul. 19, 2012

(86) PCT No.: PCT/EP2012/003069
§ 371 (c)(1),
(2), (4) Date: Mar. 3, 2014

(87) PCT Pub. No.: WO2013/034214
PCT Pub. Date: Mar. 14, 2013

(65) Prior Publication Data
US 2014/0247845 A1    Sep. 4, 2014

(30) Foreign Application Priority Data
Sep. 5, 2011  (EP) .................................... 11007185

(51) Int. Cl.
*H01S 3/04* (2006.01)
*H01S 3/03* (2006.01)
(Continued)

(52) U.S. Cl.
CPC . *H01S 3/03* (2013.01); *B23K 26/06* (2013.01); *H01S 3/076* (2013.01); *H01S 3/0975* (2013.01)

(58) Field of Classification Search
CPC .......... H01S 3/03; H01S 3/076; H01S 3/0975
USPC ......................................... 372/34, 92, 93, 97
See application file for complete search history.

(56) References Cited

U.S. PATENT DOCUMENTS 3,705,999 A    12/1972  Hermann et al.
3,919,663 A *  11/1975  Caruolo et al. ............... 372/107
(Continued)

FOREIGN PATENT DOCUMENTS

DE    4029187 A1    3/1992
DE    4212390 A1    10/1993
(Continued)

OTHER PUBLICATIONS

International Application No. PCT/EP2012/003073, Preliminary Report on Patentability, Sep. 26, 2013, 14 pages.
(Continued)

*Primary Examiner* — Xinning Niu
*Assistant Examiner* — Vu A Vu
(74) *Attorney, Agent, or Firm* — Hoffman Warnick LLC (57) ABSTRACT

The invention refers to a laser device comprising a plurality of linear resonator tubes (12) for a gas to be excited, the resonator tubes being in fluidic communication with each other and forming a common tubular space, connecting elements (20) arranged in corners between adjacent resonator tubes of a common tubular space, excitation means (50) for the resonator tubes for exciting the gas in the resonator tubes for generating a laser light, mirrors (22) arranged in the connecting elements for reflecting laser light between the resonator tubes, and a partially reflecting output coupler (42) for coupling out a laser beam. The resonator tubes are arranged in the shape of a helix, surrounding a free central space. The invention also relates to a method for generating laser light with such a laser device.

15 Claims, 5 Drawing Sheets

(51) Int. Cl.
*B23K 26/06* (2014.01)
*H01S 3/07* (2006.01)
*H01S 3/0975* (2006.01)

(56) References Cited

U.S. PATENT DOCUMENTS

| | | | |
|---|---|---|---|
| 4,131,782 A | 12/1978 | Einstein et al. | |
| 4,189,687 A | 2/1980 | Wieder et al. | |
| 4,376,946 A | 3/1983 | Kaminow et al. | |
| 4,467,334 A | 8/1984 | Anzai | |
| 4,500,998 A | 2/1985 | Kuwabara et al. | |
| 4,652,722 A | 3/1987 | Stone et al. | |
| 4,720,618 A | 1/1988 | Stamer et al. | |
| 4,727,235 A | 2/1988 | Stamer et al. | |
| 4,744,090 A * | 5/1988 | Freiberg | 372/94 |
| 4,907,240 A | 3/1990 | Klingel | |
| 4,912,718 A * | 3/1990 | Klingel | 372/58 |
| 4,991,149 A | 2/1991 | Maccabee | |
| 5,012,259 A | 4/1991 | Hattori et al. | |
| 5,109,149 A | 4/1992 | Leung | |
| 5,115,446 A | 5/1992 | Von Borstel et al. | |
| 5,229,573 A | 7/1993 | Stone et al. | |
| 5,229,574 A | 7/1993 | Stone | |
| 5,268,921 A | 12/1993 | McLellan | |
| 5,337,325 A | 8/1994 | Hwang | |
| 5,339,737 A | 8/1994 | Lewis et al. | |
| 5,431,199 A | 7/1995 | Benjay et al. | |
| 5,572,538 A | 11/1996 | Saitoh et al. | |
| 5,592,504 A | 1/1997 | Cameron | |
| 5,646,907 A | 7/1997 | Maccabee | |
| 5,706,305 A | 1/1998 | Yamane et al. | |
| 5,729,568 A | 3/1998 | Opower et al. | |
| 5,815,523 A * | 9/1998 | Morris | 372/66 |
| 5,982,803 A | 11/1999 | Sukhman et al. | |
| 6,050,486 A | 4/2000 | French et al. | |
| 6,057,871 A | 5/2000 | Peterson | |
| 6,069,843 A | 5/2000 | DiMarzio et al. | |
| 6,122,562 A | 9/2000 | Kinney et al. | |
| 6,141,030 A | 10/2000 | Fujita et al. | |
| 6,229,940 B1 | 5/2001 | Rice et al. | |
| 6,263,007 B1 | 7/2001 | Tang | |
| 6,303,930 B1 | 10/2001 | Hagiwara | |
| 6,370,884 B1 | 4/2002 | Kelada | |
| 6,421,159 B1 | 7/2002 | Sutter et al. | |
| 6,539,045 B1 | 3/2003 | Von Borstel et al. | |
| 6,856,509 B2 | 2/2005 | Lin | |
| 7,346,427 B2 | 3/2008 | Hillam et al. | |
| 7,496,831 B2 | 2/2009 | Dutta et al. | |
| 7,521,651 B2 | 4/2009 | Gross et al. | |
| 2001/0030983 A1 | 10/2001 | Yuri et al. | |
| 2003/0010420 A1 | 1/2003 | Morrow | |
| 2003/0123040 A1 | 7/2003 | Almogy | |
| 2003/0147443 A1 | 8/2003 | Backus | |
| 2005/0056626 A1 | 3/2005 | Gross et al. | |
| 2005/0094697 A1 | 5/2005 | Armier et al. | |
| 2006/0161381 A1 | 7/2006 | Jetter | |
| 2009/0010285 A1 | 1/2009 | Dubois et al. | |
| 2009/0245318 A1 | 10/2009 | Clifford, Jr. | |
| 2009/0323753 A1 | 12/2009 | Gmeiner et al. | |
| 2011/0102537 A1 | 5/2011 | Griffin et al. | |
| 2014/0224778 A1 | 8/2014 | Armbruster et al. | |

FOREIGN PATENT DOCUMENTS

| | | | |
|---|---|---|---|
| DE | 10125447 A1 | 1/2002 | |
| EP | 0157546 A2 | 10/1985 | |
| EP | 0427229 A3 | 5/1991 | |
| EP | 1184946 A1 | 3/2002 | |
| GB | 1495477 A | 12/1977 | |
| GB | 2211019 A | 6/1989 | |
| GB | 2249843 A | 5/1992 | |
| GB | 2304641 A | 3/1997 | |
| JP | 63094695 A | 4/1988 | |
| JP | 5129678 A | 5/1993 | |
| JP | 2001276986 A | 10/2001 | |
| JP | 2007032869 A | 2/2007 | |
| JP | 2007212118 A | 8/2007 | |
| JP | 2011156574 A | 8/2011 | |
| WO | 0046891 A1 | 8/2000 | |
| WO | 0107865 A2 | 2/2001 | |
| WO | 0243197 A2 | 5/2002 | |

OTHER PUBLICATIONS

International Application No. PCT/EP2012/003072, Preliminary Report on Patentability, Mar. 12, 2014, 7 pages.
International Application No. PCT/EP2012/003071, Preliminary Report on Patentability, Mar. 12, 2014, 5 pages.
International Application No. PCT/EP2012/003070, Preliminary Report on Patentability, Mar. 12, 2014, 7 pages.
International Application No. PCT/EP2012/003069, Preliminary Report on Patentability, Nov. 27, 2013, 32 pages.
International Application No. PCT/EP2012/003068, Preliminary Report on Patentability, Mar. 12, 2014, 5 pages.
International Application No. PCT/EP2012/003067, Preliminary Report on Patentability, Nov. 28, 2013, 19 pages.
International Application No. PCT/EP2012/003066, Preliminary Report on Patentability, Nov. 28, 2013, 19 pages.
International Application No. PCT/EP2012/003065, Preliminary Report on Patentability, Nov. 28, 2013, 21 pages.
International Application No. PCT/EP2012/003064, Preliminary Report on Patentability, Nov. 15, 2013, 18 pages.
International Application No. PCT/EP2012/003063, Preliminary Report on Patentability, Mar. 12, 2014, 5 pages.
International Application No. PCT/EP2012/003062, Preliminary Report on Patentability, Mar. 12, 2014, 6 pages.
International Application No. PCT/EP2012/003061, Preliminary Report on Patentability, Mar. 12, 2014, 6 pages.
International Application No. PCT/EP2012/003073, Search Report and Written Opinion, Nov. 18, 2012, 8 pages.
International Application No. PCT/EP2012/003072, Search Report and Written Opinion, Oct. 8, 2012, 11 pages.
International Application No. PCT/EP2012/003071, Search Report and Written Opinion, Nov. 15, 2012, 9 pages.
International Application No. PCT/EP2012/003070, Search Report and Written Opinion, Oct. 8, 2012, 11 pages.
International Application No. PCT/EP2012/003069, Search Report and Written Opinion, Sep. 27, 2012, 8 pages.
International Application No. PCT/EP2012/003068, Search Report and Written Opinion, Nov. 15, 2012, 8 pages.
International Application No. PCT/EP2012/003067, Search Report and Written Opinion, Nov. 16, 2012, 7 pages.
International Application No. PCT/EP2012/003066, Search Report and Written Opinion, Nov. 15, 2012, 7 pages.
International Application No. PCT/EP2012/003065, Search Report and Written Opinion, Nov. 16, 2012, 7 pages.
International Application No. PCT/EP2012/003064, Search Report and Written Opinion, Nov. 16, 2012, 7 pages.
International Application No. PCT/EP2012/003063, Search Report and Written Opinion, Nov. 15, 2012, 9 pages.
International Application No. PCT/EP2012/003062, Search Report and Written Opinion, Nov. 15, 2012, 10 pages.
International Application No. PCT/EP2012/003061, Search Report and Written Opinion, Sep. 10, 2012, 9 pages.
U.S. Appl. No. 14/342,493, Office Action dated Nov. 19, 2014.
U.S. Appl. No. 14/342,510, Office Action dated Aug. 1, 2014.
U.S. Appl. No. 14/342,508, Office Action dated Aug. 14, 2014.
U.S. Appl. No. 14/342,503, Office Action dated Aug. 21, 2014.
U.S. Appl. No. 14/342,487, Office Action dated Aug. 14, 2014.
U.S. Appl. No. 14/342,483, Office Action dated Oct. 2, 2014.
U.S. Appl. No. 14/342,508, Final Office Action dated Dec. 10, 2014, 23 pages.

* cited by examiner

LASER DEVICE AND METHOD FOR GENERATING LASER LIGHT

FIELD OF THE INVENTION

The invention refers to a laser device comprising a plurality of linear resonator tubes for a gas to be excited, the resonator tubes being in fluidic communication with each other and forming a common tubular space, connecting elements arranged in corners between adjacent resonator tubes of the common tubular space, excitation means for the resonator tubes for exciting the gas in the resonator tubes for generating a laser light, mirrors arranged in the connecting elements for reflecting laser light between the resonator tubes, and a partially reflecting output coupler for coupling out a laser beam.

The invention further relates to a method for generating laser light.

RELATED ART

The output power of a laser device is among other factors determined by the length of the tubular space, in particular the distance between the output coupler and a rear mirror. This means that as the power requirement increases so does the length of the laser. As the laser power approaches 20 to 30 watts, the length of the laser device may become impractical for many applications.

Figure 1:
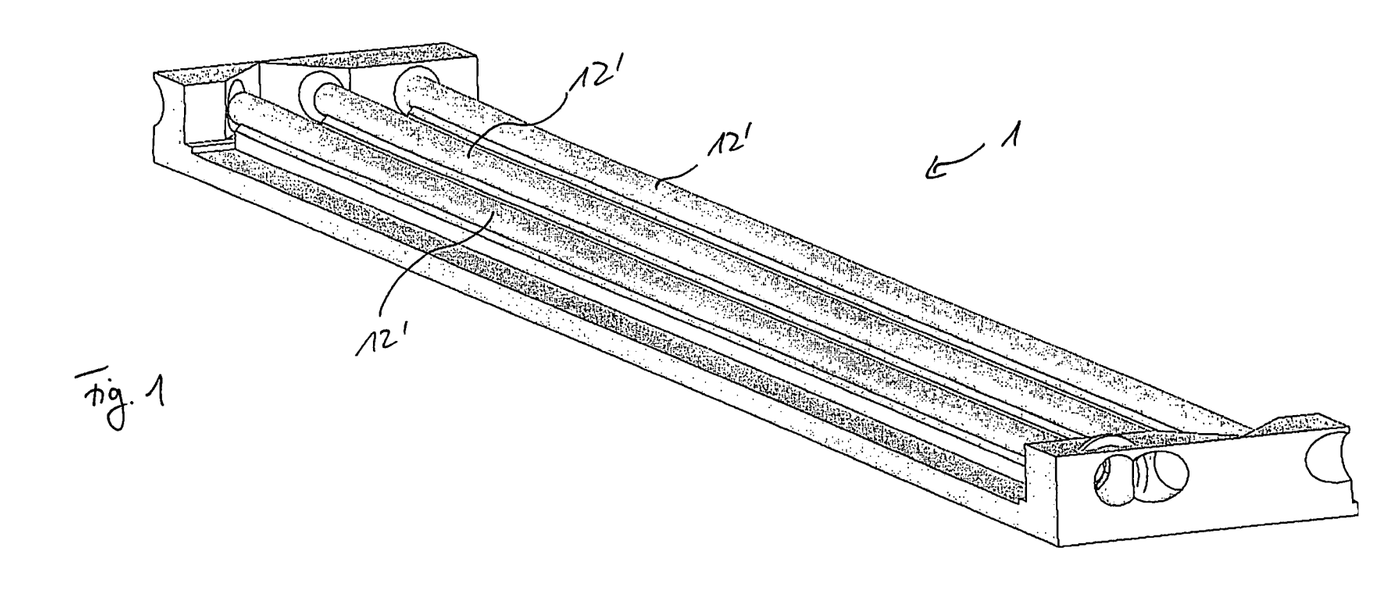
FIG. 1 shows an arrangement of resonator tubes of a laser device according to the prior art.

Laser developers have used folded tubular spaces, as shown in FIG. 1, to minimize the increase in length at the expense of cross-section. The design approach of these laser developers has been to minimize the cross-section of the laser by squeezing the folds as close together as possible.

However, in many applications, in particular marking applications, where space is at a premium the long but small cross-section laser design results in challenging if not impossible integration problems.

U.S. Pat. No. 5,115,446 discloses a carrying structure for the flanges and other elements of two laser beam paths. According to one embodiment the two laser beam paths are coupled by means of mirrors to form a single common laser beam path.

U.S. Pat. No. 4,912,718 discloses a laser having a plurality of modules that are at least substantially the same and are connected to each other at corners of the modules by means of connecting flanges.

JP 63-94695 A describes a laser having a plurality of laser tubes arranged in a square pattern.

SUMMARY OF THE INVENTION

It is an object of the invention to provide a laser device and a method for generating laser light which are very economical and can provide a high output power.

The object is solved according to the invention by a laser device and a method for generating laser light.

The laser device according to the invention is characterized in that the resonator tubes are arranged in the shape of a helix, surrounding a free central space. The method for generating laser light is characterized in that the laser light is generated in a plurality of resonator tubes which are in fluidic communication and form a common tubular space and which are arranged in the shape of a helix.

The helix arrangement of the resonator tubes provides a compact laser device with a high power density. The power of the laser device is fundamentally determined by the length of the tubular space, which forms a cavity of the laser device in which laser light is reflected between a rear mirror at one end and the partially reflecting output coupler at the opposite end. By folding the resonator in a helix pattern around free central space, the length of the resonator may be increased without increasing in the same amount the overall length of the laser device.

The inventive laser device has a longitudinal axis extending within the free central space. The resonator tubes are wound in a helical manner around the longitudinal axis.

The resonator tubes form a common tubular space, which may also be referred to as a resonator of the laser device. In other words the laser device comprises a resonator including a plurality of resonator tubes which may be fluidically connected with each other.

The inventive laser device can be a gas laser and in particular a $CO_2$ laser device, wherein the gas in the resonator or resonator tubes includes $CO_2$. The gas is excited by means of excitation means in order to generate laser light within the resonator or the resonator tubes.

The laser device can in particular be a marking head, and may be used for marking or engraving an object with a laser beam.

The rear mirror, which may be a totally reflecting mirror, is arranged at a first end of the common tubular space of the laser device. The output coupler, in some cases a partially reflecting mirror, is arranged at an opposite second end of the common tubular space. Hence, the resonator is defined at opposite axial ends by the rear mirror and the output coupler. A part of the laser light in the tubular space is coupled out as the laser beam through the output coupler.

The laser device provides a free inner space that is surrounded by the resonator tubes and in which additional components of the laser device may be placed. Such additional components may for example be electronic components such as drivers for the excitation means, or optical components such as one or more lenses or one or more mirrors for a deflection of the laser beam. Such components are safely received in the free inner cavity in the centre of the laser device.

The helix arrangement of the resonator tubes also allows for an effective cooling of the resonator tubes, because the resonator tubes are not squeezed as in the typical folded arrangement as shown in FIG. 1.

The resonator tubes may be in particular linear or straight tubes, that is, they have a longitudinal axis extending along a straight line. Corner areas may be formed between adjacent resonator tubes.

Connecting elements or corner flanges are arranged in the corners between the resonator tubes and are connected in each case to two adjacent resonator tubes. The mirrors for coupling the laser light between the resonator tubes are placed at or received within the connecting elements. The connecting elements or corner flanges may include a ceramic material. One of the connecting elements comprises the output coupler and the same or another connecting element comprises the rear mirror.

In an embodiment of the invention the resonator tubes are arranged in a polygonal helix pattern, in particular a rectangular or square helix pattern. The helix has in this case a polygonal cross-section and the resonator tubes surround a substantially polygonal free space. The entire laser device has a polygonal, in some cases a rectangular or square, cross-section with a polygonal or cubic central space. The resonator tubes are arranged at outer surfaces of the polygonal or cubic free central space.

The resonator tubes are arranged at outer surfaces of the polygonal or cubic free central space.

Instead of a rectangular or square helix pattern, the resonator tubes can also be arranged in any other polygonal shape, for example a triangular helix pattern or a helix having a cross-section with five, six or more corners.

According to the invention the angle which is formed between two adjacent resonator tubes may be greater than 60°, and in some cases at least 90°. It may also be preferred according to the invention that the angles between two adjacent resonator tubes are equal.

A compact laser device, in particular for marking an object, is achieved in that the laser device may be configured to emit the laser beam into the free central space surrounded by the resonator tubes. To this end, a deflecting mirror may be provided which deflects the laser beam passing through the output coupler in the direction of the free central space. The deflecting mirror, which may also be referred to as an output mirror, may be arranged outside the resonator of the laser device.

An advantage of the deflection of the laser beam towards the space enclosed by the resonator tubes is that additional optical components of the laser device such as lenses or additional mirrors for deflecting and/or rearranging the laser beam may be placed within the laser device, thereby providing a very compact design.

In another embodiment a scanning device is provided which includes at least one movable mirror for deflecting the laser beam coupled out through the output coupler into predetermined directions. The scanning device may be arranged in the free central space surrounded by the resonator tubes. It may redirect the laser beam through an opening in a housing of the laser device from the inside of the laser device to an outside of the laser device.

For providing the common tubular space it may be preferred that at least one of the connecting elements comprises at least one inner cavity which is in fluidic communication with at least two adjacent resonator tubes of the helix pattern. The inner cavity may have a tubular of pipe-like form with a first axial opening at a first axial end and a second axial opening at a second axial end of the cavity. The first axial end of the cavity can be connected to a first resonator tube and the second axial end of the cavity can be connected to a second resonator tube. In addition, the inner cavity formed in the connecting flange may have a third opening in a corner portion to which a mirror may be attached for reflecting laser light between the resonator tubes.

In another embodiment of the invention at least one of the connecting elements comprises a plurality of separate inner cavities which are each in fluidic communication with two adjacent resonator tubes of the helix pattern. In other words the at least one connecting element extends along an edge of the laser device and connects several resonator tubes of the helix pattern. Such an integrated support structure or corner or edge flange is constructed to provide several fluidic and/or optical connections between several pairs of resonator tubes. The connecting element of this type preferably connects various resonator tubes in different levels of the helix.

In an embodiment of the invention the resonator tubes in the helix pattern have a constant slope. That is, an angle formed between the longitudinal axis of the laser device and the longitudinal axes of the resonator tubes is the same for a plurality, in some cases all, of the resonator tubes. In this case all resonator tubes and all connecting elements can be equally constructed.

In another embodiment of the invention the helix pattern of the resonator tubes is formed by a first plurality of resonator tubes arranged in parallel planes and a second plurality of resonator tubes connecting in each case two resonator tubes of different planes. This embodiment provides a compact design with a good stability. A majority of the resonator tubes is arranged in parallel planes or levels and these planes or levels are interconnected by connecting resonator tubes which are inclined relative to the other resonator tubes.

It may also be preferred according to the invention that the helix pattern of the resonator tubes is formed by resonator tubes arranged in parallel planes and connecting channels for connecting in each case two resonator tubes of different planes. Due to the parallel arrangement of the resonator tubes all resonator tubes may be identically constructed. For providing a common tubular space the levels of resonator tubes are interconnected by connecting channels which preferably extend along the longitudinal axis of the laser device, in some embodiments in a direction perpendicular to the longitudinal axes of the resonator tubes.

A compact design can be achieved in that the connecting channels are arranged in the connecting elements. The connecting channels may preferably extend along a longitudinal axis of the respective connecting element.

For exciting the excitable gas in the resonator tubes, it may be preferred that the excitation means for each resonator tube include at least one electrode, in particular embodiments a radio frequency electrode. The electrode may in particular extend along the axial length of the resonator tubes. For reasons of efficiency and for uniform excitation of the gas in the resonator tube, radio frequency (RF) inductors might be connected to the electrodes. For example, the RF inductor may have a helical coil design. A known problem with this solution is that the helical coil design of a RF inductor substantially increases the size of the laser and is costly.

According to the invention, a compact and flat design of the laser device may be achieved in that the at least one electrode has a planar coil design. In the planar coil design, the coil and the electrode may in particular be arranged in one single flat plane. In an embodiment the coil of the electrode may be arranged in a spiral form.

In an embodiment of the invention a cooling device is provided for simultaneously cooling a plurality of the resonator tubes. The cooling device may be a cooling plate or cooling block arranged at an outer surface of the laser device for simultaneously cooling a plurality of resonator tubes arranged in different levels of the helical resonator tube arrangement.

In an embodiment of the invention the tubular space is a closed gas system. This may mean in particular that the resonator of the laser device is a completely closed cavity and that there is no constant gas flow through the resonator. The gas in the resonator, that is in the common tubular space, is only replaced in certain intervals when the laser device is out of operation. Therefore, no gas inlet and no gas outlet are provided for a constant flow of gas through the tubular space and no space is needed for equipment pumping the gas through the system.

BRIEF DESCRIPTION OF THE DRAWINGS

The invention will now be further described with reference to the attached Figures, wherein.

In all Figures, identical or corresponding components are identified by identical reference signs.

DETAILED DESCRIPTION OF THE INVENTION

FIG. 1 shows a folded design of resonator tubes 12' of a laser device 10' according to the prior art. The resonator tubes 12' are arranged close to each other and nearly parallel in order to provide a small cross-section.

Figure 2:
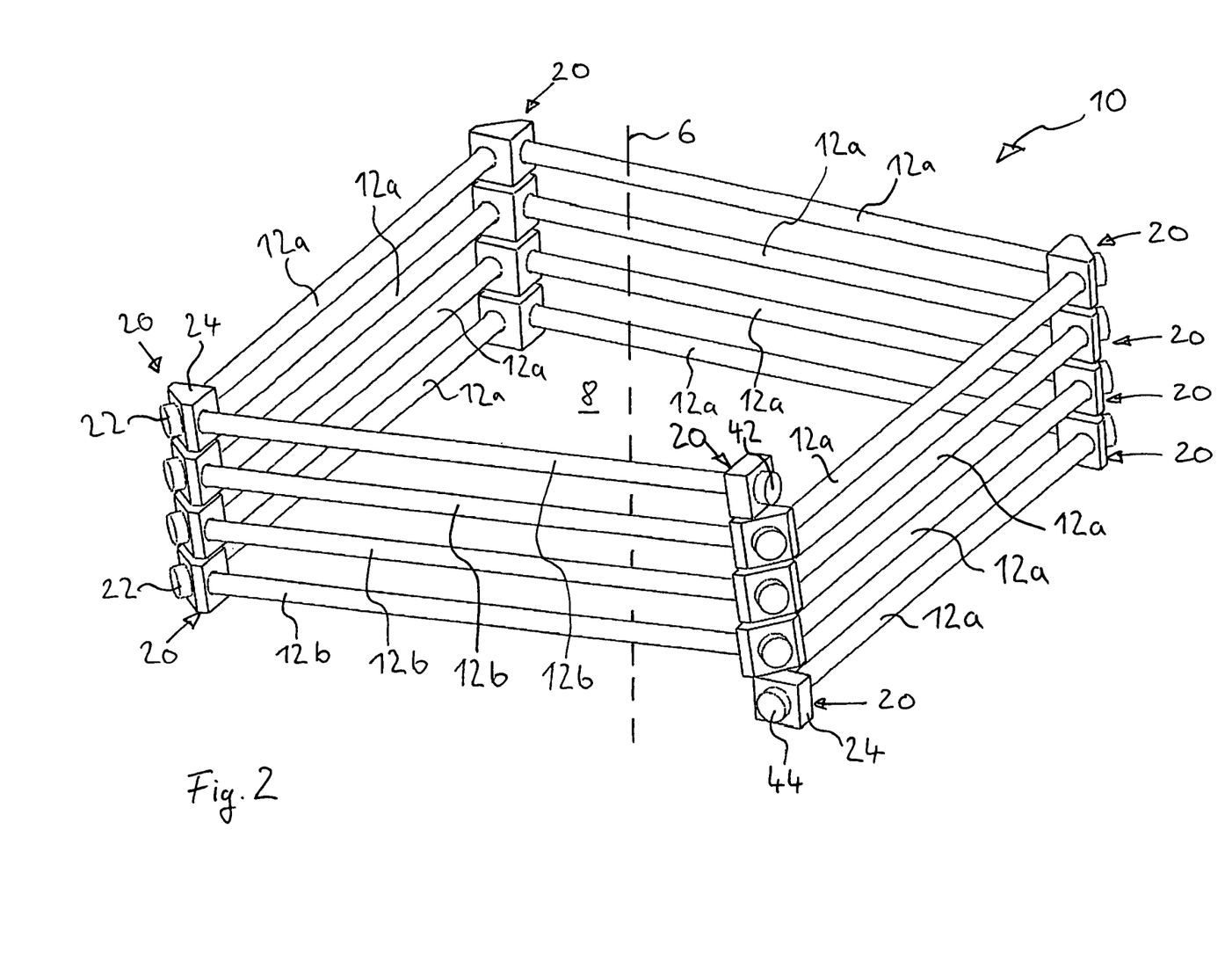
FIG. 2 shows a first embodiment of a laser device according to the invention.

FIG. 2 shows a first embodiment of a laser device 10 according to the invention. The laser device 10 may in particular be a laser device for marking an object by means of a laser beam. The laser device 10 may also be called a marking head for marking an object.

The laser device 10 comprises a plurality of resonator tubes 12 which may in particular be alumina tubes. The resonator tubes 12 form a part of a common tubular space which may be referred to as the resonator of the laser device 10.

The laser device 10 has the form of a cube having four side faces and two head faces. A longitudinal axis 6 extends parallel to the side faces. Side edges extend between adjacent side faces. A free central space 8 is formed in an inner area of the laser device 10. The space 8 is surrounded on the side faces of the cubic laser device 10 by the resonator tubes 12.

The resonator tubes 12 are at least partially enclosed by excitation means 50 in the form of radio frequency electrodes 52 for exciting an excitable gas contained in the resonator tubes 12. The electrodes 52 extend substantially along the entire length of the resonator tubes 12 for exciting the gas contained therein. An inner electrode 52a may be arranged on an inner side of the resonator tubes facing the free central space 8 and an outer electrode 52b may be arranged on an outside face of the resonator tubes 12, as shown in FIG. 6.

The resonator tubes 12 are arranged in the form of a helix having a square cross-section. However, instead of a square cross-section, the resonator tubes 12 may also take the shape of a triangle or any other polygonal shape. The design can be optimized to the power required and the volume limitation of the particular application.

Connecting elements 20 are arranged in the corners of the polygonal cross-section for connecting adjacent resonator tubes 12. Each connecting element 20 comprises a base body 24 and a mirror 22. The mirror 22 redirects laser light from one resonator tube 12 to another, and may be connected to the base body 24 at a corner portion thereof. The connecting elements 20 may be integrated into edge flanges extending along the side edges of the laser device 10 and connecting several pairs of resonator tubes 12 (not depicted).

One of the connecting elements 20 contains a rear mirror 44 for reflecting the laser light at an axial end to the common tubular space. The rear mirror 44 may be directly or indirectly connected to one of the resonator tubes 12 which may be called an end resonator tube.

At the end of a second resonator tube 12 an output coupler 42 is arranged for coupling out a laser beam. The output coupler 42 is a partially reflecting mirror and may be arranged in one of the connecting elements 20. In the depicted embodiment, the output coupler 42 emits a laser beam away from the free space 8. For redirecting the laser beam into the free space 8 an additional mirror may be provided (not depicted). In an embodiment the rear mirror 44 and the output coupler 42 are arranged at the same connecting element 20 or connecting flange.

A first plurality of resonator tubes 12a is arranged in parallel planes, that is, the first plurality of resonator tubes 12a may have longitudinal axes, which are arranged perpendicular to the longitudinal axis 6 of the helix or the laser device 10. A second plurality of resonator tubes 12b is arranged such that one end is connected to a first layer of resonator tubes and a second end is connected to a second layer of resonator tubes. These connecting resonator tubes 12b may be preferably arranged on one common side face of the laser device 10.

Figure 3:
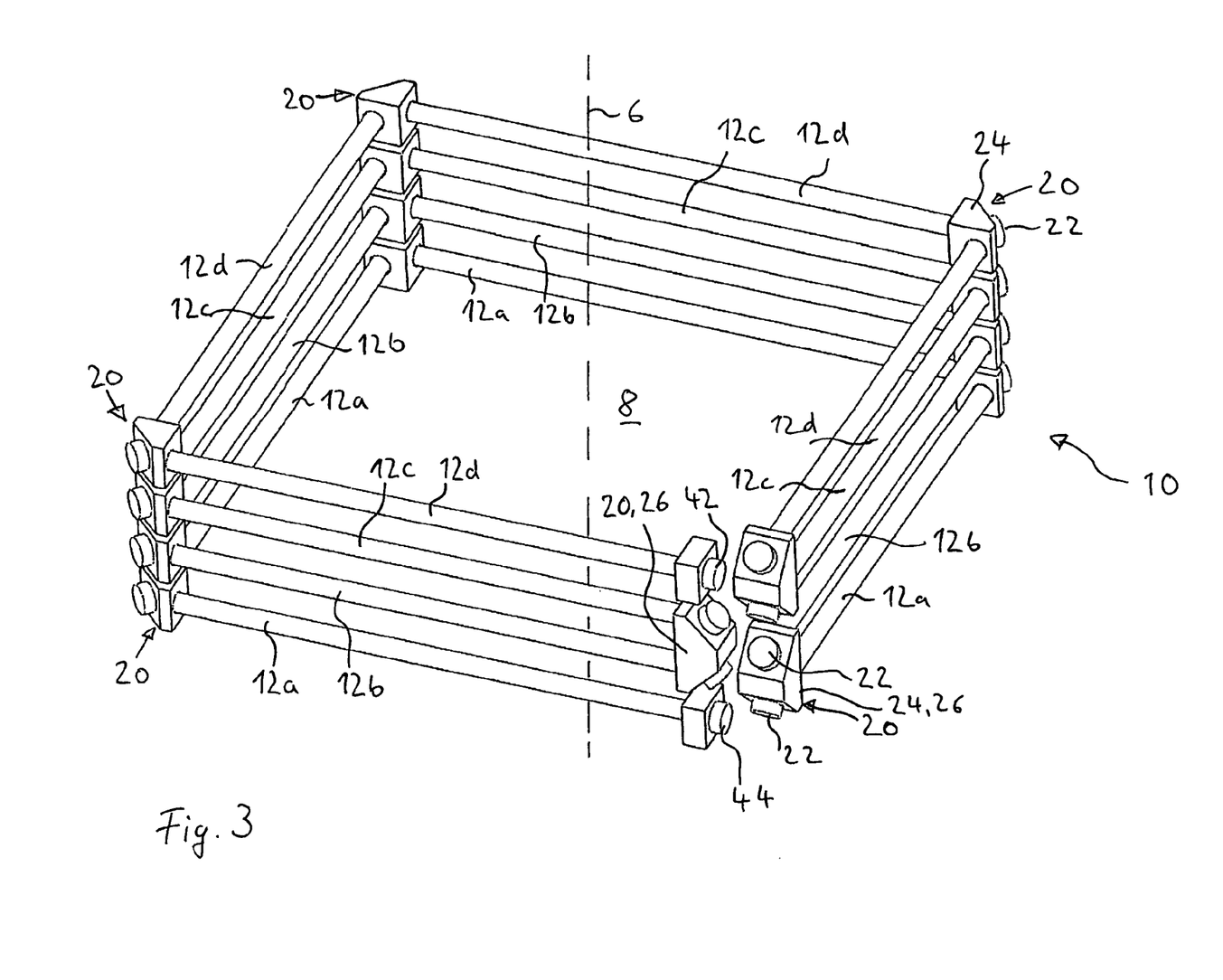
FIG. 3 shows a second embodiment of a laser device according to the invention.

A second embodiment of an inventive laser device 10 is shown in FIG. 3. The resonator tubes 12 are arranged in a plurality of parallel layers or planes. That is, a first plurality of resonator tubes 12a is arranged in a first layer, a second plurality of resonator tubes 12b is arranged in a second layer, a third plurality of resonator tubes 12c is arranged in a third layer and so forth. For forming the common tubular space the layers or planes of the resonator tubes 12 are interconnected by connecting channels 26 which may be preferably arranged within one or more of the connecting elements 20, as schematically depicted in FIG. 3. The connecting channels 26 may extend perpendicularly to the axes of the resonator tubes 12a-12d. For redirecting laser light within the connecting channel 26, at least two mirrors 22 may be provided at the base body 24 of the respective connecting element 20.

The common tubular space created with the connecting channels 26 may form an open helix, i.e., the layers of resonator tubes 12 do not necessarily extend along the complete circumference of the free space 8.

Figure 4:
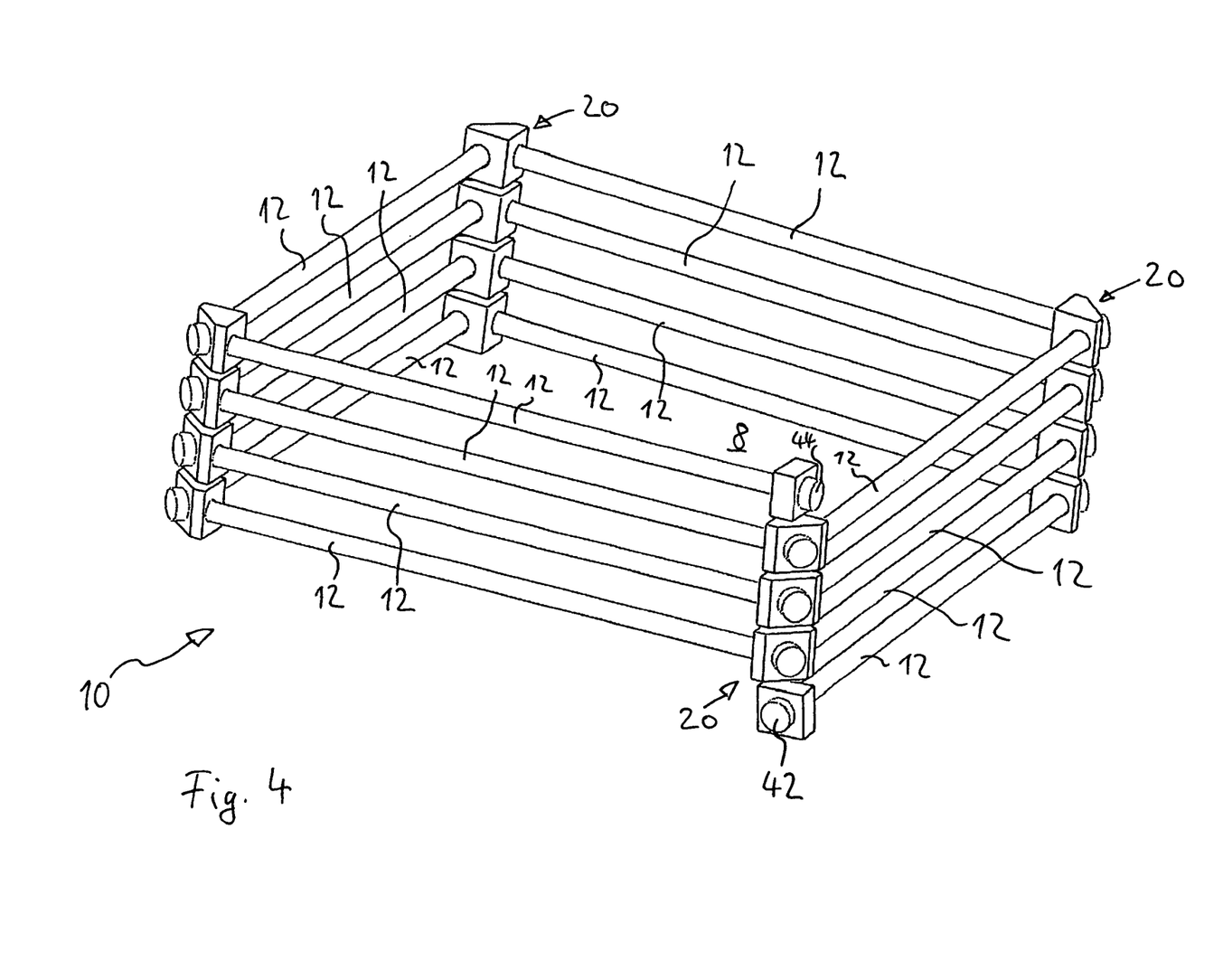
FIG. 4 shows a third embodiment of a laser device according to the invention.

In a third embodiment, which is shown in FIG. 4, the resonator tubes 12 have equal or constant slopes. All resonator tubes 12 at one side face of the laser device 10 are arranged in a parallel manner.

Figure 5:
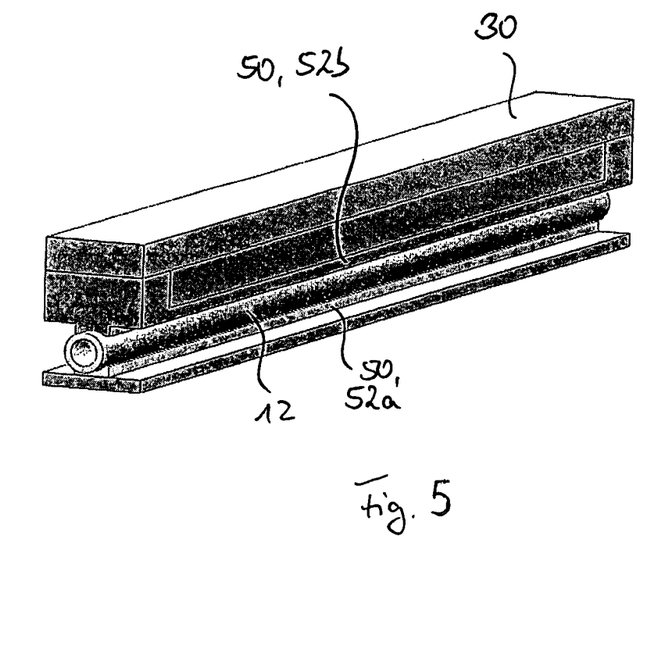
FIG. 5 shows a resonator tube with excitation means and a cooling device.

A resonator tube 12 with an excitation means 50 in the form of an electrode 52 is shown in FIG. 5. A first electrode 52a extends on an inner side of the resonator tube 12 facing the free space 8 and a second electrode 52b extends on an outer side of the resonator tube 12. Moreover, a cooling device 30 is provided which extends along the outer side of the resonator tube 12.

The inventive design may provide a compact laser device with a free space surrounded by the resonator tubes for receiving other elements of a laser device, for example optical elements for redirecting a laser beam emitted through the output coupler, or electronic components such as driver circuits for controlling the electrodes. The resonator tubes, which are wound in a helical manner around the free central space provide a long common tubular space or resonator for a high output power of the laser device.

The invention claimed is:

1. A laser device comprising:
a plurality of linear resonator tubes for a gas to be excited, the plurality of linear resonator tubes being in fluidic communication with each other and forming a common tubular space;
connecting elements arranged in corners between adjacent resonator tubes of the common tubular space and connecting adjacent resonator tubes;
excitation means for the resonator tubes for exciting the gas in the resonator tubes for generating a laser light;
mirrors arranged in the connecting elements for reflecting laser light between the resonator tubes; and
a partially reflecting output coupler for coupling out a laser beam,
wherein the resonator tubes, which are in fluidic communication with each other, are arranged in the shape of a helix, surrounding a central space free of resonator tubes,
wherein the arrangement in the shape of the helix comprises a plurality of layers of resonator tubes on top of one another, wherein the plurality of layers of resonator tubes are interconnected to form one common gas volume.

2. The laser device according to claim 1, wherein the resonator tubes are arranged in a rectangular or square helix pattern.

3. The laser device according to claim 1, wherein the laser device is configured to emit the laser beam into the free central space surrounded by the resonator tubes.

4. The laser device according to claim 1, wherein at least one of the connecting elements comprises at least one inner cavity which is in fluidic communication with at least two adjacent resonator tubes of the helix pattern.

5. The laser device according to claim 1, wherein at least one of the connecting elements comprises a plurality of separate inner cavities which are each in fluidic communication with two adjacent resonator tubes of the helix pattern.

6. The laser device according to claim 1, wherein the resonator tubes in the helix pattern have a constant slope.

7. The laser device according to claim 1, wherein the helix pattern of the resonator tubes is formed by a first plurality of resonator tubes arranged in parallel planes and a second plurality of resonator tubes connecting in each case two resonator tubes of different planes.

8. The laser device according to claim 1, wherein the helix pattern of the resonator tubes is formed by resonator tubes arranged in parallel planes and connecting channels for connecting in each case two resonator tubes of different planes.

9. The laser device according to claim 8, wherein the connecting channels are arranged in the connecting elements.

10. The laser device according to claim 1, wherein the excitation means for each resonator tube include at least one radio frequency electrode.

11. The laser device according to claim 1, wherein a cooling device is provided for simultaneously cooling a plurality of the resonator tubes.

12. The laser device according to claim 1, wherein the tubular space is a closed gas system in which there is no constant gas flow through the resonator tubes.

13. A method for generating laser light with a laser device according to claim 1, wherein the laser light is generated in a plurality of resonator tubes which are in fluidic communication and form a common tubular space and which are arranged in the shape of a helix.

14. The laser device of claim 1, wherein the one common gas volume spans across the plurality of layers of the resonator tubes.

15. The laser device of claim 14, wherein each of the plurality of layers of resonator tubes is at least partially inclined such as to connect with an adjacent layer of the plurality of layers of resonator tubes.

* * * * *